Oct. 1, 1957

D. GEORGETTE ET AL 2,808,026

IN-MOTION STARTING GATE

Filed Sept. 28, 1955

INVENTORS
Daniel Georgette
Nicholas J. Georgette
Leonard S. Georgette
BY Wooster & Davis ATTORNEYS.

Oct. 1, 1957    D. GEORGETTE ET AL    2,808,026
IN-MOTION STARTING GATE

Filed Sept. 28, 1955    4 Sheets-Sheet 3

INVENTORS.
Daniel Georgette
Nicholas J. Georgette
Leonard S. Georgette
By Wooster & Davis ATTORNEYS.

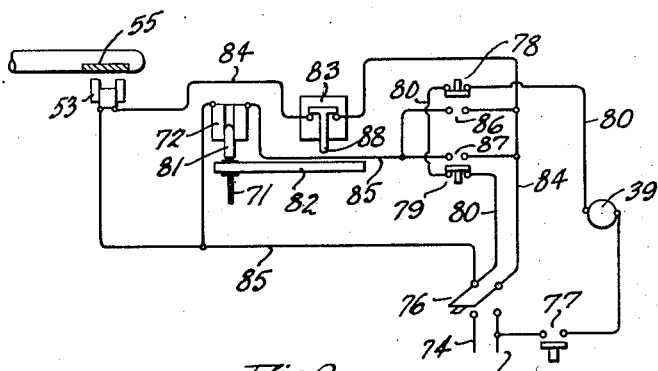
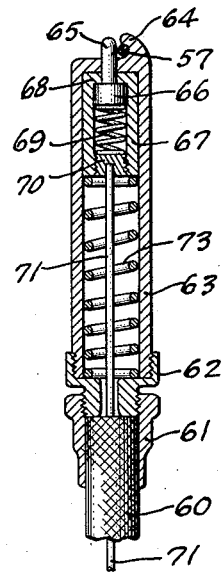
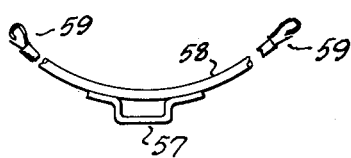
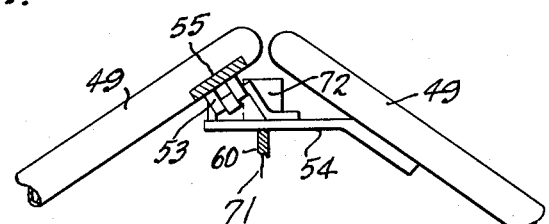
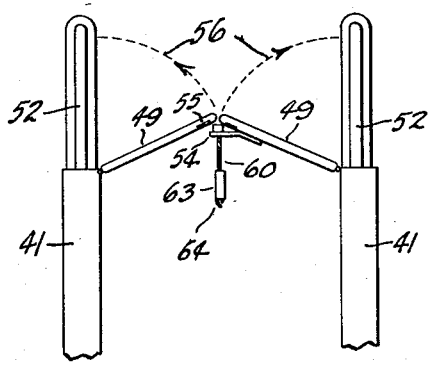
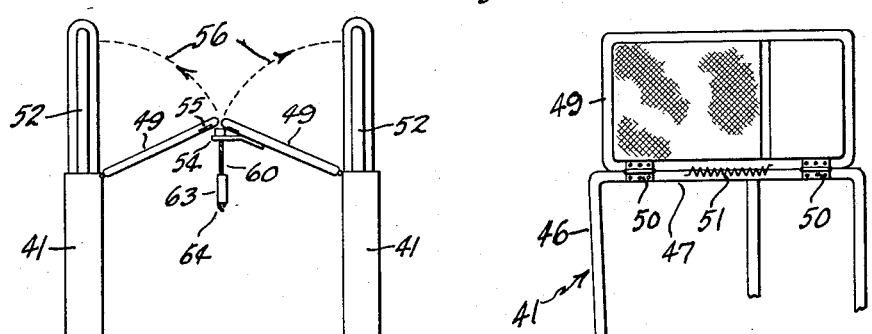

United States Patent Office 2,808,026
Patented Oct. 1, 1957

2,808,026

IN-MOTION STARTING GATE

Daniel Georgette, Nicholas J. Georgette, and Leonard S. Georgette, Stratford, Conn.

Application September 28, 1955, Serial No. 537,228

7 Claims. (Cl. 119—15.5)

This invention relates to a starting gate for horseracing tracks, and particularly to an in-motion starting gate in which the horses are in uniform motion at the time they are released from the gate, and has for an object to provide an improved construction and arrangement of this type of gate in which the horses are all led forwardly in line and at a uniform speed to the point of release, and then simultaneously released for the start of the race.

Another object is to provide an improved construction for the gate in which different stalls are employed for the different horses, but in which the stalls are simultaneously moved forwardly with leading means in each stall for the horse in that stall, with closure gates for the forward end of each stall, and with a control means for controlling the forward movement of the stalls and for simultaneously releasing the lead means and opening the gates for the horses, for simultaneous release of all of the horses while in forward motion for the start of the race.

With the foregoing and other objects in view, we have devised the construction illustrated in the accompanying drawings forming a part of this specification. It is, however, to be understood the invention is not limited to the specific details of construction and arrangement shown but may embody various changes and modifications within the scope of the invention.

In these drawings:

Fig. 4 is a somewhat diagrammatical top view of the front end of a stall and the swinging gates therefor on a larger scale;

Fig. 5 is a plan view on a larger scale of the front portion of the gates, indicating the means for controlling the operation of these gates;

Fig. 6 is a side view on an enlarged scale of the front portion of a side of the stall and one of the swinging gates;

Fig. 7 is a plan view on an enlarged scale of a portion of the securing means for connecting the lead means to the bridle of a horse;

Fig. 8 is a sectional view on an enlarged scale of a releasable means for connecting a lead to the bridle of the horse, and Fig. 9 is a wiring diagram of a control means for operation of the gate.

Figure 1:
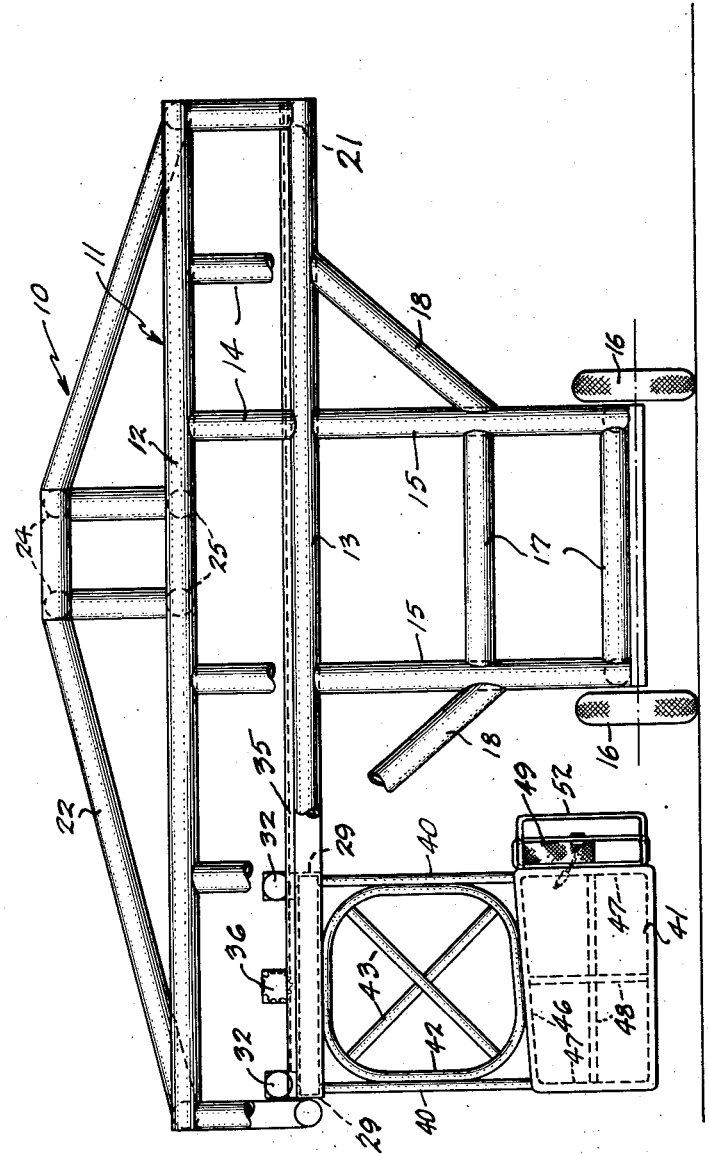
Fig. 1 is an end view of this gate showing the parts somewhat diagrammatically, and with parts broken away to more clearly show the construction.

In the usual form of starting gate the horses start from a standing start when the gates at the forward end of the stalls for the horses are released and opened. This may result in unequal or ununiform starting for the horses, with a disadvantage to some of them. It is therefore an object of this gate to provide improved means for first leading the horses forwardly in line at a uniform speed and then simultaneously releasing each horse while in motion to secure more uniform and even starting.

The device comprises a suitable frame structure 10 which may be built up of different structures and forms of structural members, but that shown comprises a frame made up primarily of suitable tubular members welded together. Thus the structure shown comprises a pair of upright end frames 11 comprising vertically spaced horizontal tubes 12 and 13 connected by any suitable number of upright tubes 14, and these end frames are supported by spaced upright tubular members 15 on a pair of supporting wheels 16 on opposite sides of the track and by which the gate may be transported to the starting position to extend transversely across a portion of the track. It is to be understood the wheels 16 may be mounted on suitable carriages (not shown) whereby they may be turned to guide them in the proper direction and directing them to the proper position with reference to the track. The uprights 15 may be suitably braced and strengthened by transverse connecting members 17 and inclined struts or braces 18 connecting them with the lower tubes 13. Outward bracing may also be secured by the inclined members 19 connected at their lower ends to a carriage or frame 20 carried by the supporting wheels. The upright frames at the opposite ends of the main frame are connected by transverse end members 21 connected to the opposite ends of the members 12 and 13, and the whole frame can be braced by diagonally arranged upwardly and inwardly inclined members 22 connected at their outer ends to corners of the frame and at their inner ends to a substantially rectangular frame structure 23 comprising connected upper and lower longitudinally extending members 24 and 25 connected by cross members 26 and braced at its ends from the end members 12 by inclined braces 27. This makes a very strong, rigid construction of relatively light weight for the material involved.

Mounted on the frame is a carriage 28 extending for the full length of the frame between the upright end frames. It is mounted for forward movement from a retracted or rear position for the starting operation. This carriage may be of any suitable construction, but in the form shown comprises a frame including laterally spaced channel bars 29 connected by suitable cross members 30 and 31 and supported to travel at its opposite ends by laterally spaced supporting wheels 32 running in channelled supporting rails 33 mounted at opposite ends of the frame, in the present case by supporting them at their opposite ends on the lower transverse members 21, and they could be also supported intermediate their ends by suitable brackets 34 secured to the end members 13. Also mounted on these brackets is a toothed rack 35 at each end of the frame with which meshes a driving pinion or gear 36 on a shaft 37 running longitudinally of the carriage 28 and supported in suitable bearings on the cross members 30 and 31. This shaft is driven through a reducing drive 38 from an electric motor 39 mounted in the carriage, so that operation of this shaft by the motor will through the gear 36 and the racks 35 shift or operate the carriage 28 forwardly for the starting operation, and, of course, operation of the carriage in the reverse direction will shift it to the retracted or rear position preparatory for the starting operation.

This carriage 28 supports a series of stalls arranged side by side, one for each of the starting horses, so that these stalls are moved forwardly simultaneously and at the same speed with movement of the carriage 28 in the starting operation. These stalls may be supported from the carriage 28 by any suitable construction, but that shown comprises a series of depending rods or tubes 40 secured at their upper ends to the members 29 and depending therefrom. They are thus arranged in pairs spaced from each other and support at their lower ends padded panels 41 forming the sides of the stalls, there thus being a stall between each pair of the depending supports 40. These supports 40 may be strengthened and braced by a generally oval or rectangular frame 42 between the supports 40 of each pair and braced by the diagonal members 43. Adjacent pairs 40 may also be braced at their upper ends by transverse members 44 and diagonal braces 45, thus forming a very strong and rigid construction for properly supporting and positioning the padded panels or sides 41 of the adjacent stalls. These panels may comprise a frame made of tubular members 46, 47 and 48, and covered with suitable padding or fibrous material to protect the horses against injury.

Figure 2:
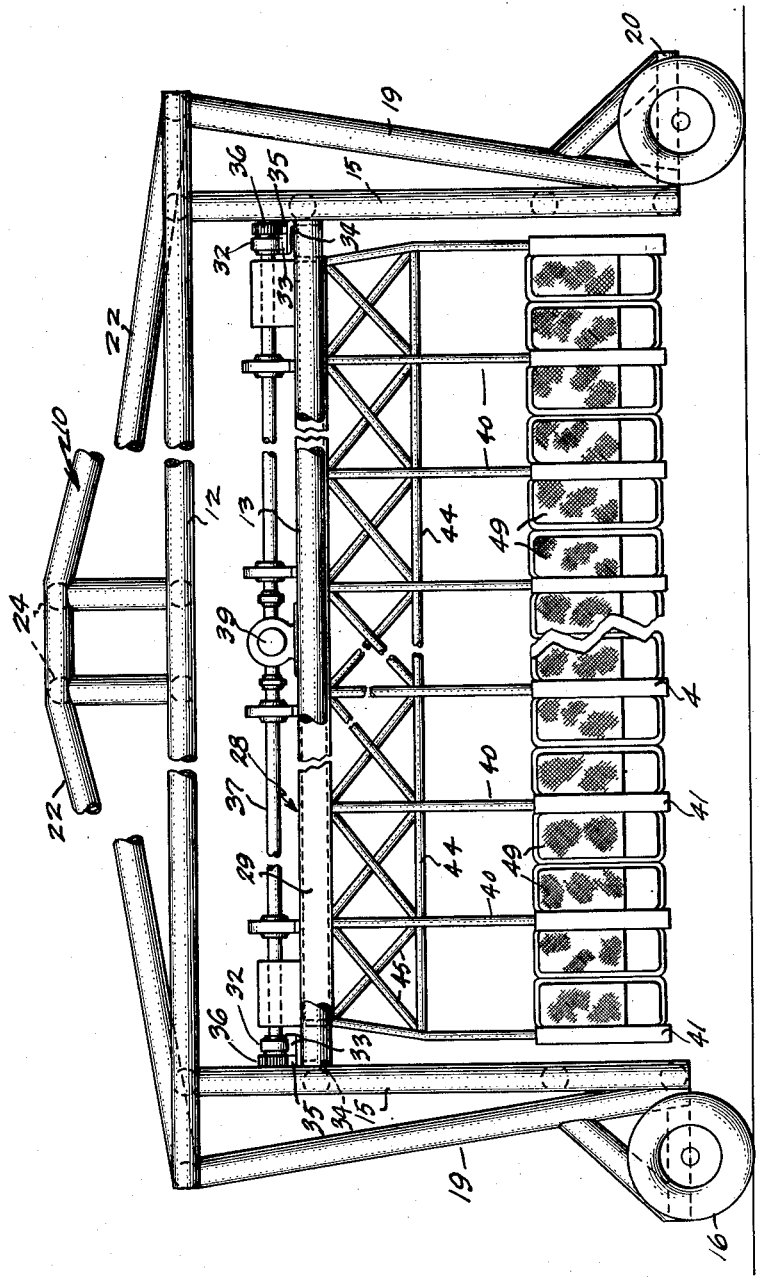
Fig. 2 is a front view of the device with parts broken away to more clearly show the construction.

Means for leading the horses and controlling the gates at the front of the stall is shown somewhat diagrammatically in Figs. 4 to 9. The front or exit end of each stall is normally closed by a pair of upright swinging gates 49 hinged to swing in a vertical plane at the front ends of the panels 41. They are shown as hinged at 50 to the frame of the panel at the forward end thereof and are each spring-loaded by any suitable spring means 51 tending to swing them from the closed to the open position against suitable stops or buffer bars 52 extending forwardly from the front edge of the panels 41, and to thus hold these gates in the open position against these buffer bars. These bars also prevent the gates from swinging too far or into alignment with the adjacent stall. Means is also provided for releasably retaining the gates in the closed or full line position of Figs. 2, 4 and 5. This as shown comprises an electromagnet or solenoid 53 mounted on one of the gates as by means of a suitable bracket 54, and associated with a soft iron magnetic plate 55 on the other door so arranged that when the solenoid or magnet 53 and plate 55 are in engagement, as shown in Fig. 5, the gates are held in the closed position across the exit end of the stall against the action of the springs 51, but when the circuit in which the solenoid is located is opened, the gates are released and automatically swung to the open position by the springs 51, as indicated diagrammatically by the dotted lines 56 in Fig. 4.

As previously indicated, means is also provided in each stall for leading the horse forwardly in the stall with forward movement of the carriage 28 and the stalls carried thereby. For this purpose there may be provided a bar 57 (Fig. 7) which may be secured by any suitable means 58, including hooks 59, to the bridle of the horse, as for example to the rings at the opposite ends of the bit, and in each stall is means releasably connected to the bar 57 forming a lead for the horse. This releasable connecting means for the lead is shown in Fig. 8 connected by a flexible tube 60 to one of the gates, as for example by the bracket 54. This connection comprises a hose connection or fitting 61 connected to the flexible tube 60. This tube may be of flexible woven wire or composed of spirally wound interlocked strips. Secured in the connection 61 is a fitting 62 threaded to one end of the outer shell or sleeve 63. At the free end of the outer shell is an open sided hook 64, on the open side of which is a slidable pin 65 rounded at its outer or free end and adapted when in the position shown in Fig. 8 to retain a member within the hook 64, in this case the bar 57 of the connection to the horse's bridle. The pin 65 includes an enlarged head 66 slidable within a sleeve 67 itself slidable in the outer shell 63. The outer end of the shell 63 is closed except for an opening for the reduced portion of the pin 65 and the same is true of the sleeve 67, as shown at 68. This closed end forms a limit stop for the enlarged head 66 of the pin, it being normally held in its outer position by a light spring 69 in the sleeve 67. Threaded into the opposite or lower end of this sleeve is an adapter 70 to which is connected a flexible cable 71 passing through the flexible tube 60 to a solenoid 72 mounted on the gate, such, for example, as the bracket 54. Within the shell 63 is a spring 73 retaining the sleeve 67 in its upper position as shown in Fig. 8. It will be evident that drawing downwardly on the flexible cable 71 will shift the sleeve 67 downwardly or inwardly in the shell 63 and will shift with it the pin 65, withdrawing it downwardly or inwardly from its position over the open side of the hook 64 and will release the bar 57, which, due to the curved shape of the inner side of the hook 64 will readily pass out of the hook with no danger of its catching or being held in it after the pin 65 is so shifted. Due to the mounting of the pin in the sleeve 67 and the light spring 69, this pin may be readily shifted in this sleeve to permit insertion of the bar 57 into the hook 64. This is readily done by merely pressing the bar 57 against the rounded outer end of the pin 65, thus shifting the pin inwardly and permitting the bar 57 to move into the hook, after which the pin 65 is shifted to the holding position by the spring 69.

In Fig. 9 is shown a wiring diagram for controlling operation of the device. Lead wires 74 and 75 are connected to any suitable source of power with a control switch 76. One side, as the wire 75, is connected through a carriage motor starting switch 77 to the motor 39 on the carriage 28, and the other side of the motor is connected to an emergency automatic release switch 78 and a starter switch 79 to the other side of the power supply through the switch 76 by the leads 80. The bridle release solenoid 72 has a movable armature 81 connected to the flexible cable 71 in the lead tube 60 and connected to this armature is a limit switch actuating arm 82 associated with a normally closed limit switch 83. This switch is connected by leads 84 from the switch 76 to the gate-locking electromagnet or solenoid 53, and by leads 85 back to the opposite side of the switch 76. Switches 78 and 79 are double switches arranged when in the normally closed position to close the circuit from the motor 39 to the leads 74 of the switch 76. When shifted from this position they are, however, adapted to close the connections 86 and 87 respectively from the lead 84 at the other side of the switch 76 by leads 85 to the bridle-release solenoids 72.

Figure 3:
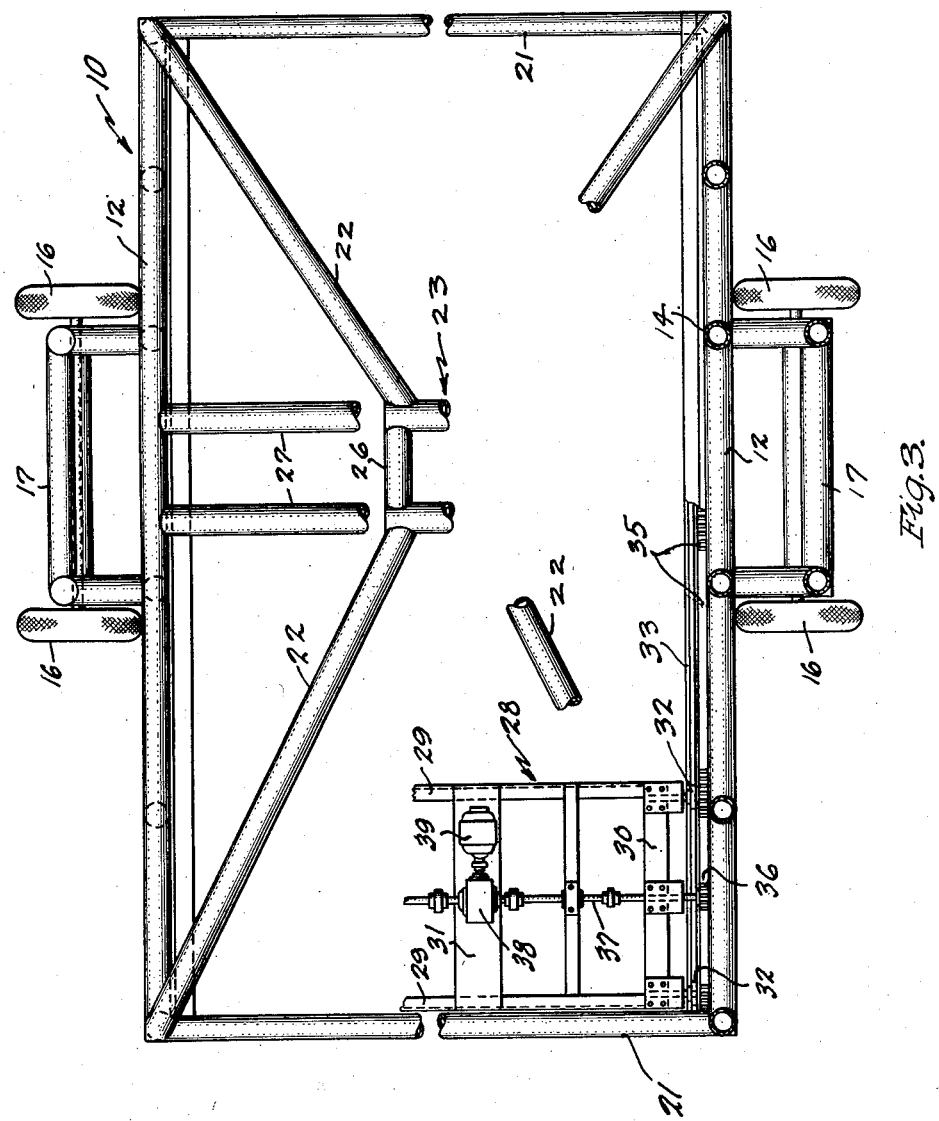
Fig. 3 is a top plan view with parts broken away.

The operation and control are as follows: With the carriage and the gates in the rear or retracted position of Figs. 1 and 3, closing of the switch 76 will energize the electromagnet or solenoid 53 on one gate of each pair, which being in engagement with the magnet plate 55 of the other gate will thus hold the gates in the closed position of Figs. 4 and 5, it being understood that although only one such solenoid and magnetic plate is shown in Fig. 9, there will be a solenoid and plate for each pair of gates at the forward or exit ends of the stalls, all controlled by this switch 76. The horses may now be led to their respective stalls through the open rear ends of the stalls and each secured to the lead 60 in his respective stall by inserting the bar 57 on its bridle into the hook 64 of this lead. Then the starter by closing the switch 77 will close the circuit through the operating motor 39 for the carriage 28 carrying the gates. Operation of this motor through the shaft 37 and the gears 36 and racks 35 will move the carriage 28 and the stalls forwardly, and the leads 60, one for each horse, will lead the horses forwardly in their stalls, the horses thus being led forwardly at a uniform speed and in alignment. After the carriage has attained the proper forward speed, and at any position desired, the starter may operate the switch 79, which will open the circuit through the motor 39 and close the circuit through the contacts 87. Closing of the switch contacts 87 will close the circuit through the bridle release solenoids 72. This will draw the armature 81 of this solenoid forwardly, which will draw inwardly the flexible cable 71 connected to this armature, which, through the sleeve 67 will draw the pin 65 inwardly and release the bridle bar 57 from the hook 64. It will be understood that there is one of these solenoids for releasing the lead for the horse in each stall, all simultaneously released by closing the switch 87. Operation of the solenoid 81 will shift the limit switch actuating arm 82 to cause it to engage the stem 88 of the limit switch 83, which will open the circuit to the solenoids 53 for the gates. This will thus simultaneously release the gates in all of the stalls and permit them to be automatically swung to their open positions by the preloaded spring 51. As the lead means 60, 63 is mounted on one of the gates, movement of the gate to open position will carry the released lead out of the way of the horse. Thus operation of the starter's switch 79 will simultaneously release the lead connections 63 from all the horses' bridles, and simultaneously release or unlock the gates, permitting them to automatically swing to their open position. It will also open the circuit through the motor 39 and stop forward movement of the carriage 28 and the stalls. Thus the leads to all of the horses and the gates to all of the stalls are simultaneously released at the same position in the forward movement of the stalls, and the horses are all simultaneously released while in alignment and moving forwardly at the same speed to effect a uniform start while the horses are in motion. The emergency release switch 78 is located at the forward end of the frame in position to be operated by forward movement of the carriage 28 to open the circuit 80 and close circuit 85 through switch 86 to automatically stop the carriage and release the leads for the horses and the stall gates should for any reason the starter switch 79 fail to have been operated before the carriage reaches this position, to thus prevent injury to the apparatus or the horses.

Having thus set forth the nature of our invention, we claim:

1. In a starting gate of the character described, a supporting frame structure, means at the opposite ends thereof for supporting the frame above and across a portion of a race track, a carriage mounted on the frame to move forwardly from a rear position, a series of stalls side by side carried by the carriage, the stalls being closed at the front by movable gates, a motor in the frame, a driving connection from the motor to the carriage for shifting the carriage and stalls forwardly on the frame, a lead in each stall including means for detachably connecting it to the bridle of a horse in the stall, releasable holding means connected to the gates for retaining the gates in the closed position, a control connected with the motor to control operation of this motor to move the carriage and stalls forwardly, operating means to release the connections of the leads to the bridles and said holding means for the gates, and operative means connected to the gates to open the gates at a desired position in the movement of the carriage and stalls.

2. In a starting gate of the character described, a main frame structure including spaced upright frame members at the opposite ends thereof for supporting the frame above and extending transversely of a race track, a carriage extending between the end members, means mounting the carriage on the frame to move forwardly from a position at the rear of the main frame to the front thereof, a motor and driving means from the motor to the carriage for said forward movement, depending supporting means carried by the carriage, separating panels carried by said supporting means forming a series of open ended stalls side by side, movable gates for closing the forward ends of the respective stalls, securing means connected to the gates for releasably holding the gates in closed position and operative means connected to the gates for automatically shifting the gates to open position on release of said holding means, lead means in each stall including means to releasably connect it to the bridle of a horse in the stall, and control means for the gate including a control connected to the motor to control operation of this motor to move the carriage and stalls forwardly and means to release the connections of the leads to the bridles and the gate securing means at a desired position in the forward movement of the stalls to permit opening of the gates and release of the horses for the start of a race.

3. In a starting gate of the character described, a main frame structure including upright supporting end members for the frame above and extending transversely of a race track, longitudinally extending rails at the ends of the frame, a carriage carried by wheels running on the rails, a motor and driving means from the motor to the carriage for shifting it forwardly in the frame, depending supports carried by the carriage, a plurality of laterally spaced panels carried by said supports forming a series of open ended stalls side by side, a lead means in each stall including means for releasably connecting it to the bridle of a horse in the stall, movable gates for closing the forward ends of the respective stalls including releasable means for holding the gates in closed position and operative means connected to the gates to automatically shift these gates to open position on release of said holding means, and control means to control operation of the starting gate including means connected with the motor to control operation of the motor to move the stalls forwardly, and said control means including means to release the connections of the leads to the bridles and the stall gate holding means at a desired position in the forward movement of the stalls to permit opening of the gates.

4. In a starting gate of the character described, a main frame structure, means for supporting the frame above and extending transversely of a race track, a plurality of open ended stalls arranged side by side, means mounting the stalls in the frame for simultaneous forward movement from a rear position, a motor having an operative connection with the stalls for simultaneously shifting said stalls forwardly for a race starting operation, a lead means in each stall including means for releasably connecting it to the bridle of a horse in the stall, movable gates for closing the forward ends of each of the stalls including releasable securing means connected to the gates for holding the gates in closed position, operative means connected to the gates for shifting the gates to open position on release of said holding means, and control means connected with the motor including means to control the motor for forward movement of the stalls, and control means to release the connections of the leads to the bridles and the gate holding means at a desired position in the forward movement of the stalls to simultaneously release the horses for the start of a race.

5. In a starting gate of the character described, a main frame structure, means at the opposite ends thereof for supporting the frame above and extending transversely of a race track, a carriage mounted on the frame for forward movement thereon, an electric motor, a driving connection from the motor to the carriage for advancing the carriage, a plurality of open ended stalls arranged side by side and carried by the carriage above the track, a lead means in each stall including releasable means for connecting it to the bridle of a horse in the stall, electrically operated means connected with said connecting means for releasing them, movable gates for closing the forward ends of the respective stalls, electrically operated means for releasably holding the gates in closed position and means for shifting the gates to open position on release of said holding means, electric circuit means for connecting the motor and said electrically operated releasing means to a source of current supply, and control means connected to said circuits operable to control operation of the motor to control forward movement of the stalls, and control said electrically operated releasing means at a desired position of the stalls to release the leads and the gate holding means for opening of the gates.

6. In a starting gate of the character described, a main frame structure, means at the opposite ends thereof for supporting the frame above and extending transversely of a race track, a plurality of open ended stalls arranged side by side, means mounting the stalls in the frame for simultaneous forward movement above the track from a rear position, a motor, a driving connection from the motor to the stalls for shifting the stalls forwardly, gates for closing the forward ends of the respective stalls, means mounting the gates for movement between open and closed positions, releasable securing means connected to the gates for holding the gates in closed position, automatically operable means connected to the gates for shifting the gates to open position on release of said holding means, and control means for the gate including control means connected to the motor to control forward movement of the stalls and operative means connected to the gate securing means to release the gates at a desired position in the forward movement of the stalls to simultaneously release the horses in the respective stalls for a race.

7. In a starting gate of the character described, a main frame structure, means at the opposite ends thereof for supporting the frame above and extending transversely of a race track, a plurality of open ended stalls arranged side by side, means mounting the stalls in the frame for simultaneous forward movement above the track from a rear position, a motor, driving means connecting the motor with the stalls for shifting the stalls forwardly, a lead means in each stall including means for releasably connecting it to the bridle of a horse in the stall, and control means for the gate including a control connected with the motor to control forward movement of the stalls and operative means connected to said releasable connections between the leads and the bridles to simultaneously release the leads at a desired position in the forward movement of the stalls to simultaneously release the horses for a race.

References Cited in the file of this patent
UNITED STATES PATENTS

| | | |
|---|---|---|
| 674,162 | Carr | May 14, 1901 |
| 1,942,642 | Golden | Jan. 9, 1934 |
| 2,165,937 | Nancarrow | July 11, 1939 |
| 2,273,493 | McMillan | Feb. 17, 1942 |

FOREIGN PATENTS

| | | |
|---|---|---|
| 22,822/29 | Australia | Sept. 9, 1930 |